United States Patent [19]

Kimura et al.

[11] Patent Number: 4,568,068

[45] Date of Patent: Feb. 4, 1986

[54] MOUNTING INSULATOR FOR INTERNAL COMBUSTION ENGINE OR THE LIKE

[75] Inventors: Akira Kimura, Zushi; Masao Ishihama, Yokosuka; Toshiro Abe, Yokohama; Kiyoshi Shimada; Shinichi Matsui, both of Yokosuka, all of Japan

[73] Assignee: Nissan Motor Company, Ltd., Yokohama, Japan

[21] Appl. No.: 454,547

[22] Filed: Dec. 30, 1982

[30] Foreign Application Priority Data

Jan. 8, 1982 [JP] Japan .................................. 57-1416

[51] Int. Cl.$^4$ .............................................. F16F 1/36
[52] U.S. Cl. ................................. 267/140.1; 248/562; 267/64.13
[58] Field of Search ................ 267/30, 8 R, 31, 64.13, 267/35, 64.11, 36 R, 22 R, 152, 158-165, 140.1-140.5, 141, 141.1-141.6; 248/562, 563, 636, 619, 621

[56] References Cited

U.S. PATENT DOCUMENTS

| 1,991,184 | 2/1935 | Towner ................................. 267/35 |
| 2,380,899 | 7/1945 | Strachousky ..................... 267/140.1 |
| 3,005,608 | 10/1961 | Andrews et al. .................... 248/619 |
| 3,730,473 | 5/1973 | Pepi ..................................... 267/136 |
| 3,770,232 | 11/1973 | Blake ............................... 267/140.4 |
| 4,378,936 | 4/1983 | Brenner ........................... 267/140.2 |

FOREIGN PATENT DOCUMENTS

| 0038547 | 10/1981 | European Pat. Off. . |
| 1172480 | 6/1964 | Fed. Rep. of Germany . |
| 1805789 | 5/1970 | Fed. Rep. of Germany . |
| 57-422 | 1/1982 | Japan . |
| 57-423 | 1/1982 | Japan . |

OTHER PUBLICATIONS

St. Fronius et al, Taschenbuch Maschinenbau, 4th ed., vol. 1/II, Veb Verlag Technik, pp. 468-475.

Primary Examiner—Bruce H. Stoner, Jr.
Assistant Examiner—Alvin Oberley
Attorney, Agent, or Firm—Schwartz, Jeffery, Schwaab, Mack, Blumenthal & Evans

[57] ABSTRACT

A plate spring is operatively connected to an automotive internal combustion engine so that when the engine vibrates with a relatively high frequency and small amplitude, the plate spring is merely moved backwards and forwards across an essentially flat home position wherein it exhibits a zero or even negative spring constant, and so that when the engine vibrates with a relatively low frequency and large amplitude, the spring is flexed to the degree of exhibiting a high spring constant and thus transmits the vibrational energy therethrough to a resilient body or unit interconnecting same with the vehicle chassis.

9 Claims, 13 Drawing Figures

MOUNTING INSULATOR FOR INTERNAL COMBUSTION ENGINE OR THE LIKE

BACKGROUND OF THE INVENTION

1. Field of the Invention

The present invention relates generally to a mounting insulator and more specifically to an improved arrangement wherein the rate of power transmission therethrough in the medium to high vibration frequency range is attenuated to a desirable level via the use of an ingenious plate spring and elastomeric insulator arrangement.

2. Description of the Prior Art

In a prior art arrangement shown in FIG. 1 of the drawings, an elastomeric insulator 1 has been operatively interposed between the engine 2 and the chassis 3 of a vehicle in order to both support the engine and damp vibrational energy which tends to be transmitted to the chassis 3 and induce annoying reverberation within the passenger compartment, etc. However, in order to achieve both suitable vibration damping and simultaneously resist relatively large amplitude movement of the engine which occurs when the latter operates at relatively low revolution speeds, a compromise between the spring constant and the vibration damping characteristics must be made, whereby if the elastomer is selected to suitably support the engine 2 while operating at low revolution speeds, as the engine speed rises and the vibration frequency of the vibration thereof rises from the low-medium range (L/M) to the medium-high range (M/H) i.e. above 30 Hz., for example, the force transmitted therethrough to the chassis rises, as shown by curve (I) in FIG. 2, and induces highly undesirable cabin noise or reverberation.

SUMMARY OF THE INVENTION

It is accordingly an object of the present invention to provide a simple engine mounting insulator which is able to stably support the engine when vibrating at low frequencies and relatively large amplitudes (viz., operating at low RPM), while preventing the transmission of vibrational energy which will produce reverberation when the engine is vibrating at a high frequency and relatively small amplitude (viz., operating at medium to high RPM).

The present invention features a plate spring which is operatively connected to a vibrating body such as an automotive internal combustion engine so that upon (a) the body vibrating with a relatively high frequency and small amplitude, the plate spring is merely moved backwards and forwards across an essentially flat home position wherein it exhibits a zero or even negative spring constant, and so that upon (b) the body vibrating with a relatively low frequency and large amplitude, the spring is flexed to the degree of exhibiting a high spring constant and thus transmits the vibrational energy therethrough to a resilient body or unit connected to a stationary body, which in the case of an automotive ICE takes the form of the vehicle chassis.

More specifically, the present invention takes the form of a mounting insulator for suspending a vibrating body on a stationary body comprising a resilient body connected to the stationary body and a plate spring operatively interconnecting the resilient body and the vibrating body, the plate spring being arranged to be flexible through a predetermined distance in first and second directions from a predetermined home position before applying a bias to the resilient body.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
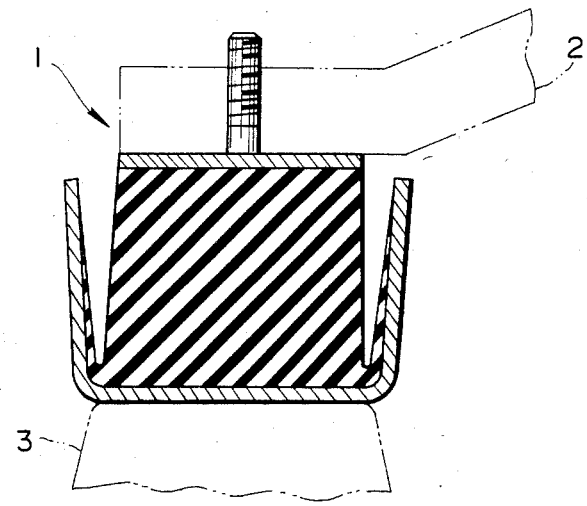
FIG. 1 is a sectional view of a prior art mounting insulator discussed briefly in the opening paragraphs of the present specification.
Figure 2:
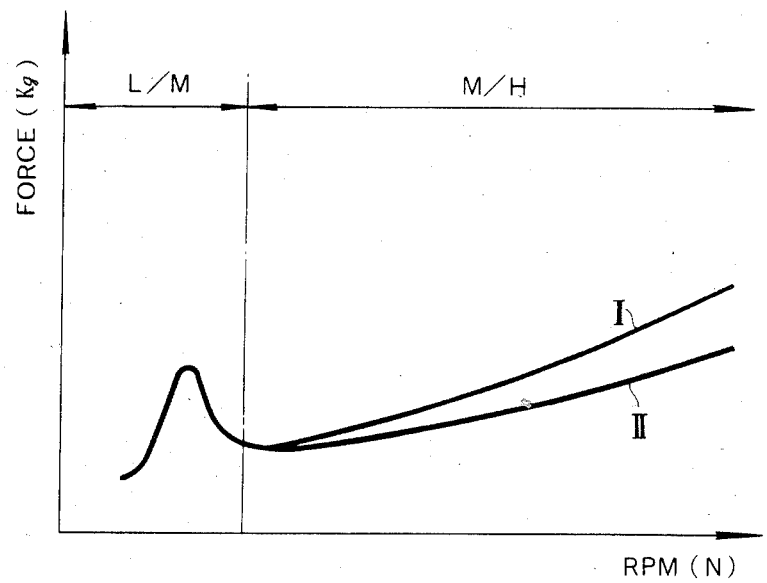
FIG. 2 is a graph showing, in terms of force transmission and engine vibration, the vibration damping characteristics provided by the prior art (curve I) and the present invention (curve II)
Figure 3:
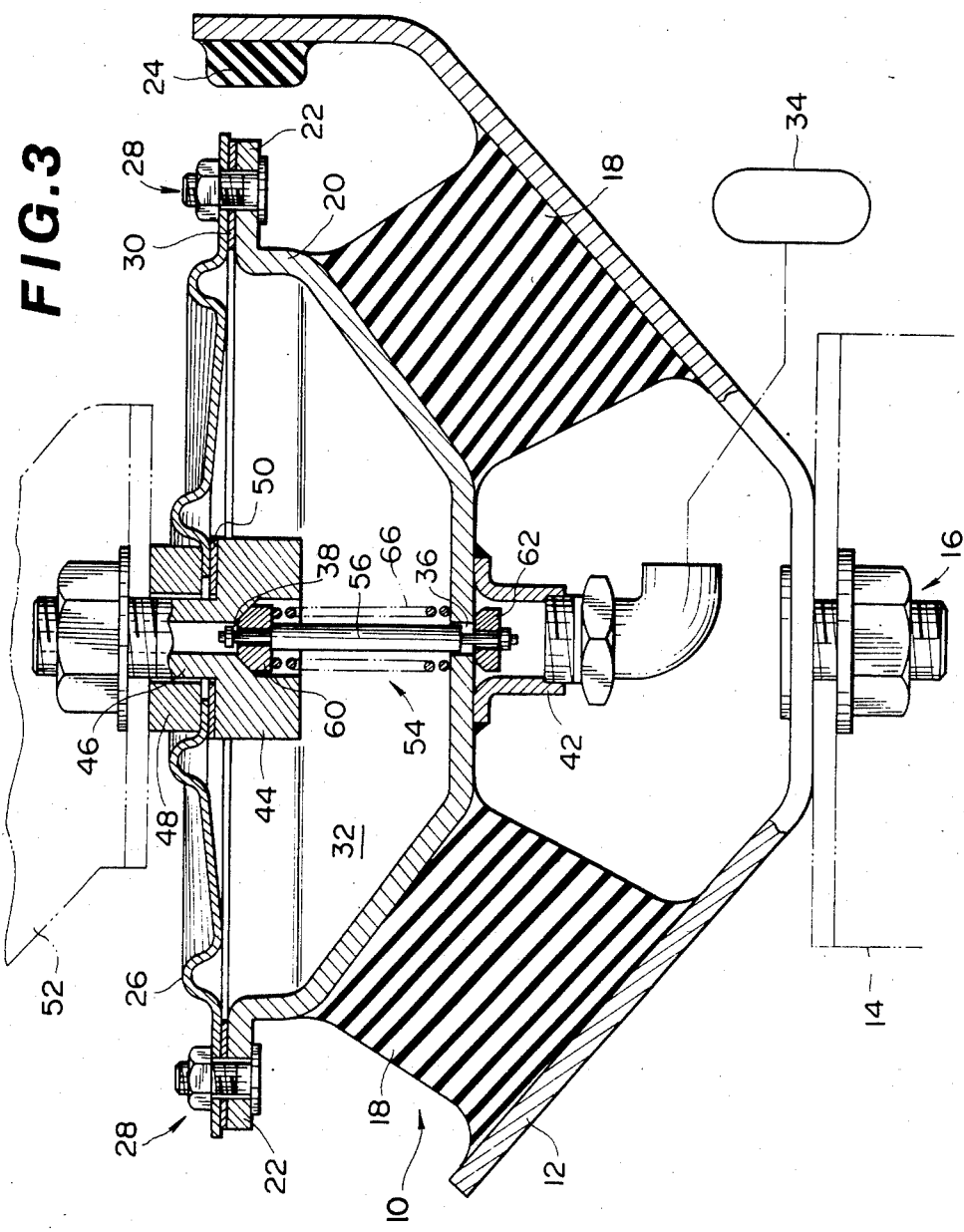
FIG. 3 is a sectional view of a first embodiment of the present invention.
Figure 4:
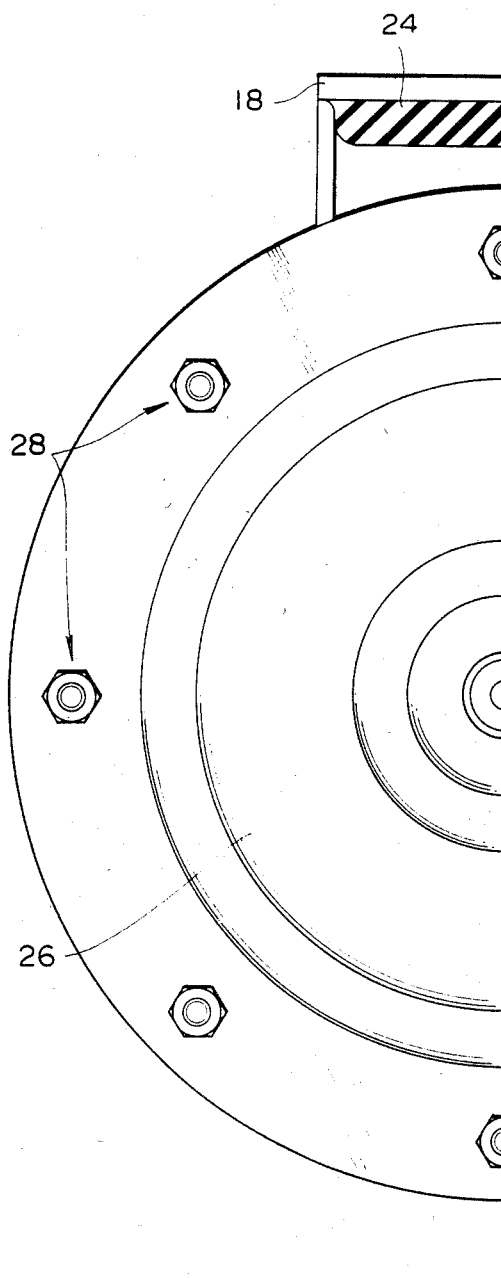
FIG. 4 is a plan view of the arrangement shown in FIG. 3.
Figure 5:
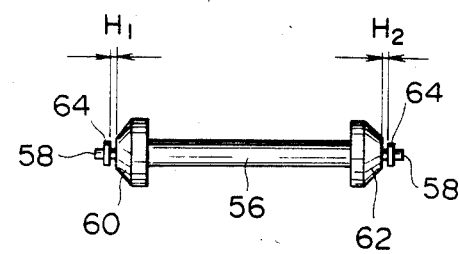
FIG. 5 is an elevation of a valve member forming a vital part of the first embodiment.

Turning now to FIGS. 3 to 5, a first embodiment of the present invention is shown. In this arrangement a mounting insulator generally denoted by the numeral 10 includes a base mounting bracket 12 removably connected to a vehicle chassis 14 through a bolt 16 and an annular block of elastomeric material 18 (hereinafter referred to as the elastomeric member) permanetly fixed thereto via vulcanization or the like. Vulcanized to the upper suface of the elastomeric member is a cup-like member 20. Similarly vulcanized to the upper arm portion of the base mounting bracket 12 and adjacent a connection flange 22 formed about the perimeter of the cup-like member 20 is a elastomeric buffer member 24 which is arranged to limit lateral movement of the aforementioned arrangement.

A corrugated plate or Bellevile spring 26 is sealingly attached to the connection flange of the cup-like member 20 via bolts 28 and a gasket 30 in a manner to define a closed variable volume chamber 32. This chamber (32) is adapted to communicate with a source of fluid (in this case air) under pressure 34 through an inlet port 36 and with the ambient atmosphere via an outlet or vent port 38. The inlet port 36 is formed by boring a through hole in the lower portion of the cup-like member 20 and welding a connection nipple arrangement 42 to the bottom thereof so as to be essential coaxially therewith. The outlet port 38 is formed in a stepped diameter member 44 sealingly disposed through an aperture formed in the middle of the plate spring 26. This member 44 is, as shown, formed with a threaded extension 46 which projects out through the aperture. A suitable nut 48 is firstly screwed onto the threaded extension to clamp a gasket 50 or similar sealing member against the inner surface of the plate spring 26, while the remaining portion of the extension 46 is used advantageously for providing a connection between a support bracket 52 fixedly connected to the engine (viz., a vibrating body).

A valve arrangement generally denoted by the numeral 54 is provided to control the inlet and outlet ports (36, 38). As best seen in FIG. 5, the valve includes a stem portion 56 formed with reduced diameter extensions 58 at each end thereof. Slidably received on these extensions are valve heads 60, 62. Snap rings 64 or the like are provided on the extensions so as to allow a predetermined amount of "lost motion" ($H_1$, $H_2$) between the valve heads 60, 62 and the stem 56 before any positive connection is established therebetween. A spring 66 is disposed about the valve stem 56 so as to be interposed between the cuplike member 20 and the bottom of the valve head 60 and biases the the valve heads 60, 62 to close the ports 36, 38. In the illustrated position the plate spring 26 is conditioned to assume an essentially flat configuration and the valve arrangement 54 so constructed that when the spring 26 assumes this position the inlet port 36 remains closed until the plate spring 26 is deflected or flexed downwardly through the distance $H_2$, while the outlet port 38 remains closed until the plate spring 26 has been flexed upwardly from the illustrated position through the distance $H_1$. It will be appreciated that the compressible fluid retained in the variable volume chamber 32 defines an "air spring".

Figure 6:
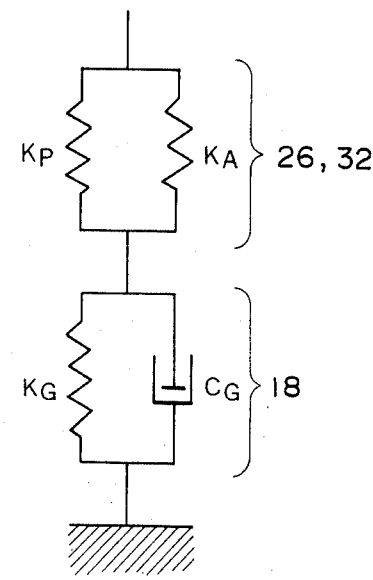
FIG. 6 is a model illustrating the first embodiment in terms of spring constants and damping coefficients.

FIG. 6 shows the just described arrangement as a model, which as shown, includes parallely arranged disc spring ($K_p$) and air spring ($K_A$) which are series connected with the parallely arranged spring constant ($K_G$) and damping modulus ($C_G$) of the elastomeric member 18.

Figure 7:
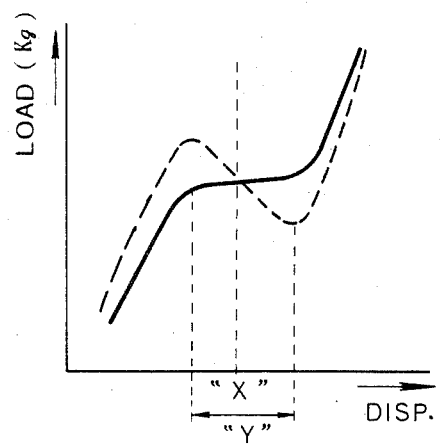
FIG. 7 is a graph showing, in terms of load and displacement, the spring constant characteristics of the plate spring which characterizes the present invention (broken line) and the resultant characteristics of the plate spring and air spring associated therewith (solid line)
Figure 8:
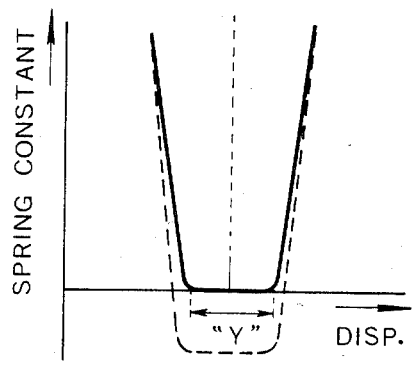
FIG. 8 is a graph showing, in terms of spring constant and displacement, the change in spring characteristics of the plate spring when flexed from a "flat" state.

The type of plate spring utilized in the present invention exhibits a change in spring characteristics as it approaches and assumes the aforementioned essentially flat configuration. This change is graphically illustrated in FIGS. 6 and 7. As will be appreciated from FIG. 7, the load or force transmitted by the spring changes as shown by the broken line curve, and the spring constant actually assumes a negative value over the range indicated by "y" which extends on either side of the point "X" (which represents the "flat" state of the plate spring). This particular characteristic is also shown by the broken line curve in FIG. 8. However, the fluid retained in the variable volume chamber (in this case air) does not undergo such dramatic changes and remains essentially constant, whereby the resulting combination of the plate spring 26 and air spring (viz, the fluid retained in the chamber 32) is as shown by the solid line curves in FIGS. 7 and 8, essentially constant over the range "y" (viz., $dF/dN = 0$, where N is displacement). The merit of this will become clear from the following description detailing the operation of the first embodiment.

It should be noted at this point that the sum of $H_1$ and $H_2$ is preferably equal to "y".

Figures 9, 10:
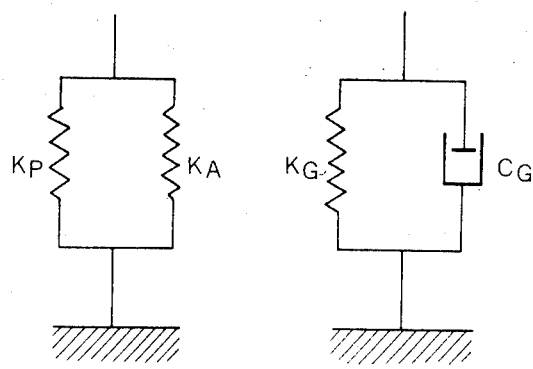
FIG. 9 is a model showing the components of the present invention which are operative when the vibration applied thereto is in the medium to high frequency range (M/H)
FIG. 10 is a model showing the components of the present invention which are operative when the vibration applied to the insulator of the present invention is within a low to medium frequency range (L/M)

During medium to high RPM engine operation, the frequency of the vibration produced thereby has an amplitude less than "y" so that the plate spring 26 merely flexes backward and forward over the flat configuration thereof without exceeding said range. Accordingly, as the spring is unable to exert any force on the cup-like member on which it is mounted, the engine mounting arrangement effectively functions as the model illustrated in FIG. 9, viz., a system comprising only two parallely arranged springs (viz., $K_P$ and $K_A$) and hence effectively damps vibration which would otherwise produce reverberation. However, upon the amplitude of the vibration increasing to the point of exceeding the range "y", the spring 26 rapidly develops a definite spring constant and thus functions to transmit the vibrational energy through the cup-like member 20 to the elastomeric member 18 which in turn functions to absorb said vibration. Hence, under these conditions, a model of the invention takes the form of the arrangement shown in FIG. 10 and again effectively damps.

Furthermore, under these conditions, air in the variable volume chamber is "pumped" in and out via the operation of the valve arrangement, and the suspension characteristics of the insulator are enhanced.

Figure 11:
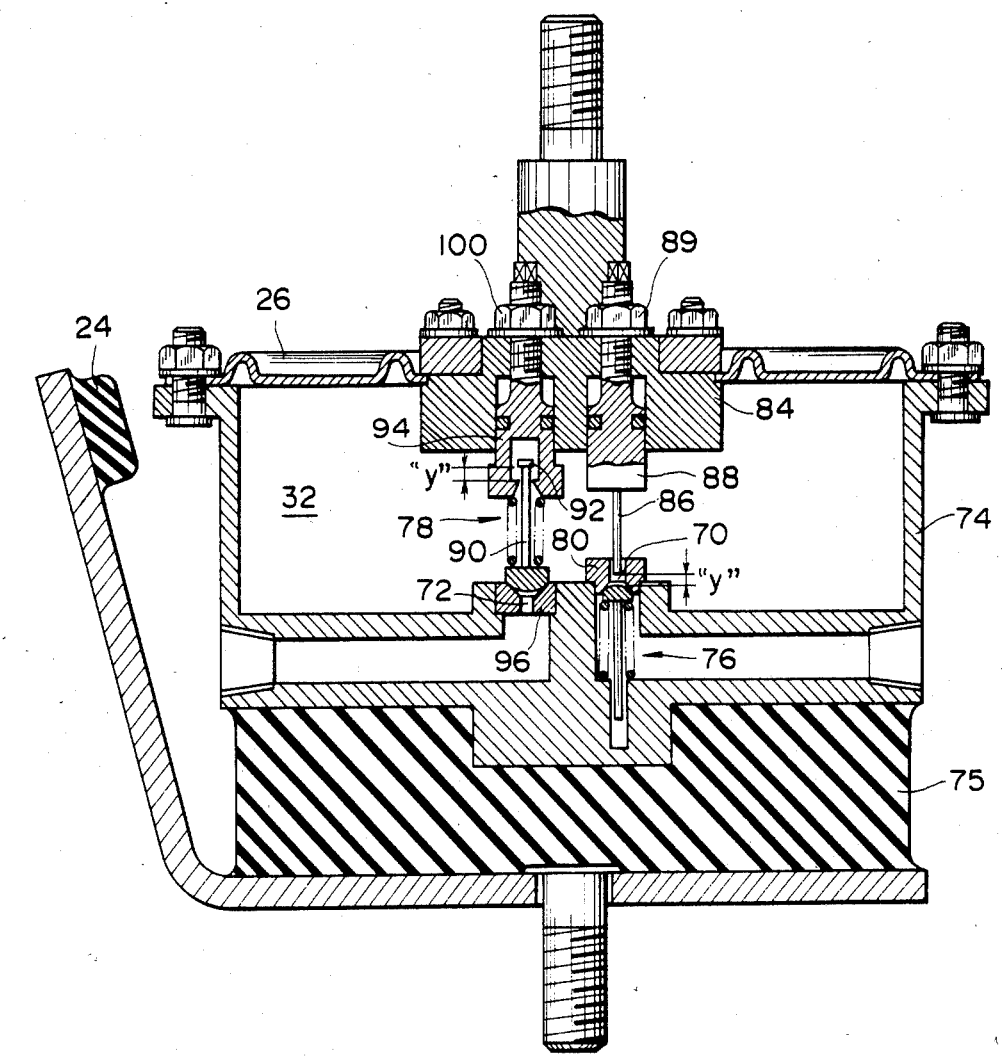
FIG. 11 shows a second embodiment of the present invention.

FIG. 11 shows a second embodiment of the present invention. In this arrangement the inlet and outlet ports 70, 72 are formed at the ends of inlet and outlet passage formed in the cup-like member 74, and controlled by poppet valves 76, 78. The cup-like member 74 in this case is vulcanized to an elastomeric body 75.

As shown the inlet poppet valve 76 is disposed in a stepped bore formed in the cup-like member 74 and retained in place a calibrated orifice-like member 80 threaded into or otherwise disposed in place at the top of the bore. A push rod arrangement is adjustably mounted on a member 84 fixedly and sealingly mounted in an aperture formed in the plate spring 26. As shown, a push rod 86 is formed on the end of a piston or slidable member 88. The outlet poppet valve 78 is mounted within the variable volume chamber 32 per se. This valve includes a valve stem 90 formed with a stopper 92 on the end thereof. The slidable member or piston 94 which cooperates with the valve 78 in this case is formed with a stepped bore, the small diameter portion of which is adapted to engage the stopper 92 and lift the the valve off a calibrated orifice-like member 96 disposed at the upstream end of the outlet passage. As shown, when the plate spring 26 assumes a flat configuration, the push rod 86 must move through a distance "y" before contacting the poppet valve 76 and biasing same to open, while the plate spring must flex in a direction to increase the volume of the variable volume chamber by a distance "y" before the valve 78 will be lifted against the bias of the spring associated therewith to open the outlet or vent port 72.

This embodiment is deemed to feature the advantage of permitting ready adustment of the sliding members 88, 94 via tightening or slackening nuts 89, 100 of adjusting and thus permits the ready adaption of the same unit with different types of vehicles and engines.

Figure 12:
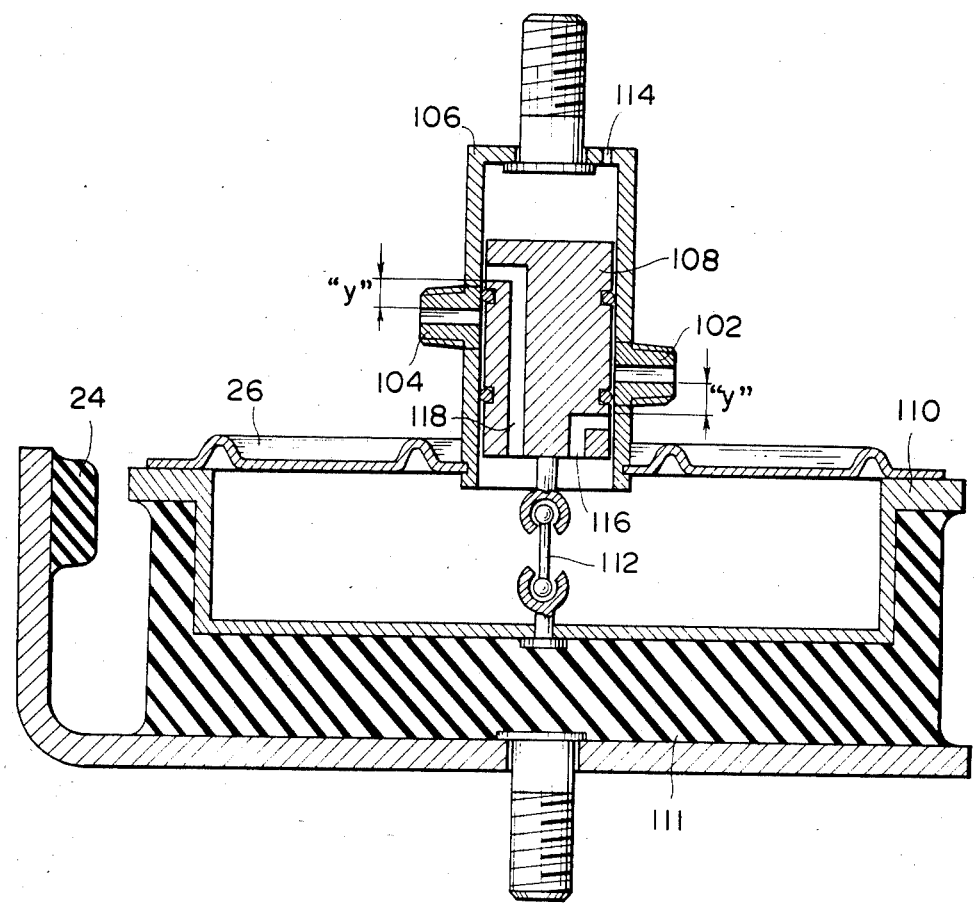
FIGS. 12 and 13 show a third embodiment of the present invention.
Figure 13:
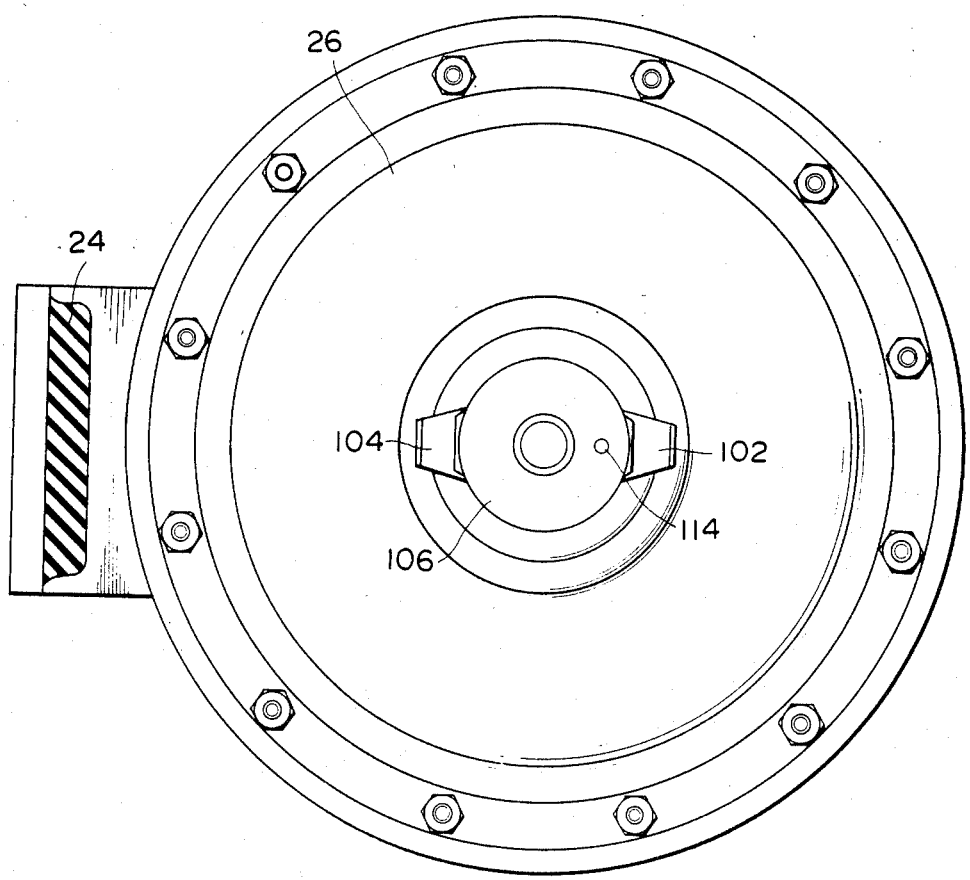

FIGS. 12 and 13 show a third embodiment of the present invention. In this arrangement, the inlet and outlet ports 102, 104 are formed in a cylindrical member 106. A piston 108 is reciprocatively disposed within the cylindrical member 106 and operatively connected with a cup-like member 110 through a connecting rod 112.

The space defined above the piston is adapted to communicate with the ambient atmosphere through a atmospheric port 114. In this case the cup-like member 110 is vulcanized to an elastomeric body 111.

Inlet and outlet passages 116, 118 are bored into the piston 108 and arranged so that the plate spring 26 must move through the distance "y" in a volume-reducing direction before the connecting rod 112 drives the piston 108 to a position wherein the inlet passage 116 establishes fluid communication between the inlet port 102 and the variable volume chamber. Similarly the plate spring 26 must move in a volume expanding direction by "y" before the piston 108 is brought to a position wherein the outlet passage 118 establishes fluid communication between the outlet port 104 and the variable volume chamber.

With the embodiments disclosed hereinbefore it will be further appreciated that upon the vehicle ascending or decending a slope and/or undergoing acceleration, a load will be placed on the mounting insulators distorting same. Under these conditions, the valves will appropriately function to suitably increase or decrease the pressure within the variable volume chamber in a manner to restore the volume thereof and thus the normal function of same, until the load is relieved whereupon the valves will operate suitably to relieve or increase the pressure in said chamber.

What is claimed is:

1. A mounting insulator for suspending a vibrating body on a stationary body, comprising:
    a resilient body connected to said stationary body, the resilient body including means for defining a closed variable volume chamber containing a compressible fluid and an elastomeric body, the elastomeric body being connected to said stationary body and said variable volume chamber defining means being operatively connected between said elastomeric body and a plate spring;
    said plate spring being connected at a center portion thereof to one of said vibrating body and said resilient body, and at a peripheral portion thereof to the other of said vibrating body and said resilient body, said plate spring having a structure which is flexible through a predetermined distance in first and second directions from a predetermined home position before applying a bias to said resilient body; and
    valve means including a source of said compressible fluid under pressure, for increasing the pressure in said variable volume chamber in response to the volume thereof decreasing and for reducing the pressure therein in response to the volume thereof increasing.

2. A mounting insulator for suspending a vibrating body on a stationary body, comprising:
    a resilient body connected to said stationary body, said resilient body comprising means for defining a closed variable volume chamber containing a compressible fluid;
    an elastomeric body connected to said stationary body;
    a plate spring operatively interconnecting said resilient body and said vibrating body, said plate spring being arranged to be flexible through a predetermined distance in first and second directions from a predetermined home position before applying a bias to said resilient body, and said variable volume chamber defining means being operatively interposed between said elastomeric body and said plate spring; and
    valve means including a source of said compressible fluid under pressure, for increasing the pressure in said variable volume chamber in response to the volume thereof decreasing and for reducing the pressure therein in response to the volume thereof increasing.

3. A mounting insulator as claimed in claim 2, wherein said plate spring defines part of said variable volume chamber.

4. A mounting insulator as claimed in claim 2, wherein said valve means is operatively connected to said plate spring so as to be responsive to the deflection of said same in said first and second directions from said home position.

5. A mounting insulator as claimed in claim 2, wherein said home position is one in which said plate spring assumes an essentially flat configuration and one in which said plate spring exhibits a minimum spring constant.

6. A mounting device as claimed in claim 4, wherein said valve means includes a lost motion connection for permitting said plate spring to move through said predetermined distance before increasing and decreasing the pressure in said variable volume chamber.

7. A mounting insulator as claimed in claim 6, wherein:
    said variable volume chamber defining means takes the form of a cup-shaped member fixedly connected to said elastomeric body, the mouth of said cup-shaped member being closed by said plate spring, said cup shaped member being formed with an inlet port which communicates with said source of fluid under pressure, and said plate spring including means defining an outlet port which fluidly communicates with the ambient atmosphere; and wherein:
    said valve means takes the form of a stem having a first valve member slidably disposed at one end thereof and a second valve member slidably disposed at the other end thereof, the movement of said first and second valve members on said stem being limited to define said lost motion connection.

8. A mounting insulator as claimed in claim 6, wherein:
    said means defining said variable volume chamber takes the form of a cup-shaped member fixedly connected to said elastomeric body, the mouth of said cup-shaped member being closed by said plate spring, said cup-shaped member being formed with an inlet port which communicates with said source of fluid under pressure and an outlet port which fluidly communicates with the ambient atmosphere; and wherein:
    said valve means takes the form of an inlet poppet valve for controlling said inlet port;
    an outlet poppet valve for controlling said outlet valve; and
    means associated with said plate spring and movable therewith for contacting and opening said inlet poppet valve upon said plate spring flexing through a predetermined distance in a direction to reduce the volume of said variable volume chamber, and for contacting and opening said outlet poppet valve upon said plate spring flexing through said predetermined distance in a direction which increases the volume of said variable volume chamber.

9. A mounting arrangement as claimed in claim 6, wherein:

said variable volume defining means takes the form of a cup-shaped member fixedly connected to said elastomeric body, said plate spring being arranged to close the mouth of said cup-like member; and wherein:

said valve takes the form of:

a valve housing including a chamber which fluidly communicates with said variable volume chamber, said valve housing being movable with said plate spring;

means defining an inlet port in said valve housing which fluidly communicates said source of fluid under pressure with the chamber in said valve housing;

means defining an outlet port in said valve housing which fluidly communicates the chamber in said valve housing with the ambient atmosphere;

a valve member reciprocatively disposed in said valve housing for controlling said inlet and outlet ports, said valve member being operatively connected with said cup-shaped member and formed with inlet and outlet passages, the arrangement being such that, upon said plate spring flexing through a predetermined distance in a direction to reduce the volume of said variable volume chamber, said inlet passage is brought into communication with said inlet port and upon said plate spring flexing by said predetermined amount in a direction which increases the volume of said variable volume chamber, said outlet passage is brought into communication with said outlet port.

* * * * *